US008276060B2

(12) United States Patent
Hong et al.

(10) Patent No.: US 8,276,060 B2
(45) Date of Patent: Sep. 25, 2012

(54) SYSTEM AND METHOD FOR ANNOTATING DOCUMENTS USING A VIEWER

(75) Inventors: Lichan Hong, Mountain View, CA (US); Ed H Chi, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1058 days.

(21) Appl. No.: 11/837,889

(22) Filed: Aug. 13, 2007

(65) Prior Publication Data

US 2008/0201651 A1    Aug. 21, 2008

Related U.S. Application Data

(60) Provisional application No. 60/890,464, filed on Feb. 16, 2007.

(51) Int. Cl.
*G06F 17/00* (2006.01)
(52) U.S. Cl. .................. 715/230; 715/232
(58) Field of Classification Search .......... 715/230, 715/200, 232, 255
See application file for complete search history.

(56) References Cited

U.S. PATENT DOCUMENTS

| | | | |
|---|---|---|---|
| 5,835,905 A | 11/1998 | Pirolli et al. | |
| 6,360,951 B1 | 3/2002 | Swinehart | |
| 6,615,199 B1 | 9/2003 | Bowman-Amuah | |
| 6,687,878 B1* | 2/2004 | Eintracht et al. | 715/201 |
| 7,051,275 B2* | 5/2006 | Gupta et al. | 715/201 |
| 7,257,774 B2 | 8/2007 | Denoue et al. | |
| 7,308,110 B2 | 12/2007 | Rhoads | |
| 7,315,857 B2* | 1/2008 | Dettinger et al. | 1/1 |
| 7,340,459 B2 | 3/2008 | Krohn et al. | |
| 7,519,573 B2* | 4/2009 | Helfman et al. | 1/1 |
| 7,685,083 B2 | 3/2010 | Fairweather | |
| 2002/0143802 A1 | 10/2002 | Chi et al. | |
| 2003/0048949 A1* | 3/2003 | Bern et al. | 382/218 |
| 2005/0060643 A1* | 3/2005 | Glass et al. | 715/501.1 |
| 2006/0053364 A1 | 3/2006 | Hollander et al. | |
| 2006/0080405 A1 | 4/2006 | Gibson | |
| 2006/0101060 A1* | 5/2006 | Li et al. | 707/102 |
| 2007/0067297 A1 | 3/2007 | Kublickis | |
| 2008/0016233 A1 | 1/2008 | Schneider | |
| 2008/0147487 A1* | 6/2008 | Hirshberg | 705/10 |
| 2008/0147821 A1 | 6/2008 | Dietrich et al. | |

OTHER PUBLICATIONS

Kozima et al., Similarity between Words Computed by Spreading Activation on an English Dictionary, 1993, ACM, pp. 232-239.*
Broder, A., "On the resemblance and containment of documents", in Proceedings of Compression and Complexity of Sequences 1997. pp. 21-29, Jun. 1997.
Brin, S. et al., "Copy Detection Mechanisms for Digital Documents", Proceedings of the 1995 ACM SIGMOD International Conference on Management of Data, pp. 398-400, 1995.

(Continued)

*Primary Examiner* — Manglesh M Patel
(74) *Attorney, Agent, or Firm* — Patrick J. S. Inouye

(57) ABSTRACT

Methods, apparatus and articles of manufacture therefor, are disclosed for annotating documents in a viewer. In one embodiment, the method includes: associating the document with a user; identifying one or more sub-document elements in the document; augmenting the document by making words within the document selectable; displaying the augmented document in the viewer; and responsive to each user input selecting a word in the document displayed in the viewer, further augmenting the document displayed in the viewer by inserting the selected word following the sub-document element from which the word was selected.

18 Claims, 10 Drawing Sheets

OTHER PUBLICATIONS

Furnas, G.W. et al., "Why do Tagging Systems Work?", CHI '06 Extended Abstracts on Human Factors in Computing Systems, ACM Press, New York NY, pp. 36-39, Apr. 22-27, 2006.

Hong, L. et al., "Annotating 3D electronic books", CHI '05 Extended Abstracts on Human Factors in Computing Systems, ACM Press, New York, NY, pp. 1463-1466, Apr. 2-7, 2005.

Marshall, C., "Annotation: From Paper Books to the Digital Library", Proceedings 1997 ACM Digital Library, pp. 131-140, 1997.

Mejias, U., "Facilitating the social annotation and commentary of web pages", available on the Internet at www.ideant.typepad.com/ideant/2005/05/facilitating_th.html, dated May 20, 2005.

Millen, D. R. et al., "Dogear: Social Bookmarking in the Enterprise", Proceedings CHI' 2006, pp. 111-120, 2006.

O'Hara, K. et al., "A comparison of reading paper and on-line documents", Proceedings of the SIGCHI Conference on Human Factors in Computing Systems, Atlanta, Georgia, pp. 335-342, Mar. 22-27, 1997.

Schilit, B. N. et al., "Beyond paper: supporting active reading with free form digital ink annotations", Proceedings of the SIGCHI Conference on Human Factors in Computing Systems, Los Angeles, California, pp. 249-256, Apr. 18-23, 1998.

Web Page entitled "MyWeb Beta", available on the Internet at www.myweb.yahoo.com, on Jul. 20, 2007.

Web Page entitled "The weblog about Greasemonkey", available on the Internet at www.greasespot.net, on Jul. 20, 2007.

Web Page entitled "What are tags?", available on the Internet at www.del.icio.us/help/tags, on Jul. 20, 2007.

Web Page entitled "What is del.icio.us?", available on the Internet at www.del.icio.us/about, on Jul. 20, 2007.

Golder et al., "Usage Patterns of Collaborative Tagging Systems," Journal of Information Science, North-Hollad, Amsterdam, NL, vol. 32, No. 2, pp. 198-208 (Jan. 1, 2006).

Gelgi et al., "Improving Web Data Annotations With Spreading Activation," Web Information Systems Engineering-WISE 2005 Lecture Notes in Computer Science, Springer, Berlin, DE, vol. 3806, pp. 95-106 (Jan. 1, 2005).

K. Yee, "CritLink: Advanced Hyperlinks Enable Public Annotation on the Web," Dec. 2002, pp. 1-4, CSCW 2002 Conference, New Orleans.

Denoue et al., "An Annotation Tool for Web Browsers and Its Applications to Information Retrieval," Proceedings of Riao, Apr. 2000, pp. 1-16.

Kahan et al., "Annotea: an Open RDF Infrastructure for Shared Web Annotations," Computer Networks, Elsevier Science Publishers B.V., Aug. 5, 2002, pp. 589-608, vol. 39, No. 5, Amsterdam, NL.

Peng Han et al., "An Adaptive Spreading Activation Scheme for Performing More Effective Collaborative Recommendation," Lecture Notes in Computer Science, SpringerLink, Springer-Verlag, Berlin Heidelberg, vol. 3588, pp. 95-104 (Sep. 15, 2005).

\* cited by examiner $$\begin{bmatrix}
\begin{array}{c}E_{DOC}\\ \begin{pmatrix}1\\0\\0\\0\\0\end{pmatrix}\end{array} = \begin{array}{c}A[1]_{DOC}\\ \begin{pmatrix}1\\0\\0\\0\\0\end{pmatrix}\end{array} & & n=1 \\
\\
\begin{array}{c}\begin{array}{ccccc}D1 & D2 & D3 & D4 & D5\end{array}\\ \begin{array}{c}T1\\T2\\T3\\T4\\T5\end{array}\begin{pmatrix}1 & 0 & 0 & 0 & 0\\1 & 1 & 1 & 0 & 0\\1 & 1 & 0 & 1 & 0\\0 & 0 & 1 & 0 & 0\\0 & 0 & 0 & 1 & 1\end{pmatrix}\end{array}\begin{array}{c}A[1]_{DOC}\\ \begin{pmatrix}1\\0\\0\\0\\0\end{pmatrix}\end{array} = \begin{array}{c}A[2]_{TAG}\\ \begin{pmatrix}1\\1\\1\\0\\0\end{pmatrix}\end{array} & & n=2 \\
\\
\begin{array}{c}\begin{array}{ccccc}T1 & T2 & T3 & T4 & T5\end{array}\\ \begin{array}{c}D1\\D2\\D3\\D4\\D5\end{array}\begin{pmatrix}1 & 1 & 1 & 0 & 0\\0 & 1 & 1 & 0 & 0\\0 & 1 & 0 & 1 & 0\\0 & 0 & 1 & 0 & 1\\0 & 0 & 0 & 0 & 1\end{pmatrix}\end{array}\begin{array}{c}A[2]_{TAG}\\ \begin{pmatrix}1\\1\\1\\0\\0\end{pmatrix}\end{array} = \begin{array}{c}A[3]_{DOC}\\ \begin{pmatrix}3\\2\\1\\1\\0\end{pmatrix}\end{array} & & n=3 \\
\\
\begin{array}{c}\begin{array}{ccccc}D1 & D2 & D3 & D4 & D5\end{array}\\ \begin{array}{c}T1\\T2\\T3\\T4\\T5\end{array}\begin{pmatrix}1 & 0 & 0 & 0 & 0\\1 & 1 & 1 & 0 & 0\\1 & 1 & 0 & 1 & 0\\0 & 0 & 1 & 0 & 0\\0 & 0 & 0 & 1 & 1\end{pmatrix}\end{array}\begin{array}{c}A[3]_{DOC}\\ \begin{pmatrix}3\\2\\1\\1\\0\end{pmatrix}\end{array} = \begin{array}{c}A[4]_{TAG}\\ \begin{pmatrix}3\\6\\6\\1\\1\end{pmatrix}\end{array} & & n=4
\end{bmatrix}$$

FIG. 10

Tag Based Search

Current Query: "javascript tutorial", *reordered*

New Search [javascript tutorial] [Submit]

Results (49)

[Reorder] [Expand]                                    Popularity Filter: [ ] [ ] [ ]

☐ Dive Into Greasemonkey
  • javascript:65 firefox:54 javascript:33 programming:27 reference:18 web:18
  • Original Rank:40 Score:0 Popularity Count:8665 - rerank expand ☐ A (Re) - Introduction to JavaScript
  • javascript:88 tutorial:24 programming:21 reference:11 tutorial:10 web:6
  • Original Rank:7 Score:13 Popularity Count:3348 - rerank expand ☐ Javascript in Ten Minutes(javascript)
  • javascript:85 tutorial:42 programming:26 reference:8 howto:8 tutorial:5
  • Original Rank:1 Score:13 Popularity Count:4789 - rerank expand ☐ AllSyntax.com - Learning JavaScript
  • javascript:74 programming:47 tutorial:45 reference:21 webdesign:19 web:16
  • Original Rank:38 Score:14 Popularity Count:1610 - rerank expand ☐ JavaScript Tutorial
  • javascript:83 tutorial:33 programming:29 reference:23 web:16 tutorial:12
  • Original Rank:4 Score:14 Popularity Count:1235 - rerank expand Common Tags
• 75%: javascript
  – DHTML
  – javascript
  – js
  – javascript
  – dom
• 31%: tutorial
  – tutorials
  – reference
  – toread
  – code
  – Guide
• 27% programming
• 12% ajax
• 12% reference
• 11% web
• 6% development
• 6% greasemonkey

*FIG. 11*

SYSTEM AND METHOD FOR ANNOTATING DOCUMENTS USING A VIEWER

CROSS REFERENCE TO RELATED APPLICATION

Priority is claimed from U.S. Provisional Application No. 60/890,464, filed Feb. 16, 2007, entitled "System And Method For Annotating Documents And Searching Annotated Document Collections", which is incorporated herein by reference. In addition, cross-reference is made to the following U.S. patent application Ser. Nos. 11/837,837, entitled "System And Method For Annotating Documents" and 11/837,942, entitled "System And Method For Searching Annotated Document Collections" that (a) are concurrently filed herewith, (b) are assigned to the same assignee as the present invention, (c) are incorporated in this patent application by reference, and (d) claim priority to U.S. Patent Provisional Application Ser. No. 60/890,464.

BACKGROUND

The following relates generally to methods, apparatus and articles of manufacture therefor, for annotating documents, and subsequently sharing such annotations and searching annotated document collections.

Web-based services are available on the Internet today that enable social tagging of web pages, such as Yahoo's MyWeb and del.icio.us. Such web-based services, allow users to tag web documents (such as web pages) of interest for sharing or later recalling the web documents by allowing users to bookmark a web document and attach a set of freely chosen tags (or keywords) to the web document. Also, users may elect to share their bookmarks or tags with other users, which may subsequently be searched and browsed by the other users.

In addition to allowing users to discover bookmarked pages via tags defined and shared by other users, data from social tagging can also be used to enhance document search. Social tagging systems, however, are limited as they do not account for the nature of the content of tagged web pages (e.g., that the content of web pages may be dynamic, or that the content of one web page may be similar to that of another web page). For example, unless a user reviews and updates tags to web documents previously defined and shared with other users, each user-specified tag associated with a URL (universal resource locator) remains the same, even as a sub-document element of the underlying content of the web page pointed to by the URL changes in a way that less accurately or no longer reflects reason why the tag was applied to the document.

Further, available social tagging systems do not account for the similarity between published web documents. For example, different web sites may publish the same or a very similar news story. Because available social tagging systems do not account for the similarity between published content in different web documents, they are not adapted to propagate tags to similar content. Such propagation of tagged information would advantageously simplify a user's effort to tag similarly published content. Also, available social tagging systems are not integrated within a web browser (or reader). Instead, available social tagging systems require users to access a web page that is independent of the web document that is being read. Such lack of interoperability encumbers the user's ability to refer to the content of a web document at the same time a tag is created or reviewed for the web document.

Accordingly, there continues to be a need for systems and methods for supporting in situ tagging of sub-document elements (such as paragraphs of web documents) and the sharing of such tagged data (or more generally annotated data). A solution for tagging sub-document elements of web documents that is integral to web browsers would advantageously reduce the amount of cognitive and interaction overhead that is required to annotate web pages. Further, by providing an integral solution that facilitates social tagging of web pages, users would advantageously be more likely to collaborate and share tagged data. Also, by propagating tags to web pages with similar content and accounting for the dynamicity of web pages, the integrity of the association between tags and sub-document elements of a web page is maintained.

Further, there continues to be a need for improved systems and methods for searching collections of documents that have been tagged (or more generally annotated) through collaborative tagging (or more generally collaborative annotation). It would therefore be advantageous to provide improved systems and methods for searching tag-based collections of documents to increase the accuracy and/or precision of searching such document collections.

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 10 illustrates an example of spreading activation with "n" equal to 4 steps;

FIG. 11 illustrates a tag-based search interface that may be made available through a web browser.

DETAILED DESCRIPTION

A. Definition of Terms

The terms defined below have the indicated meanings throughout this application, including the claims and the figures:

"Document" or "web document" is used herein to mean a collection of electronic data that may define a variable number of pages depending on how the collection of electronic data is formatted when viewed, such as documents that may be viewed using a web browser (e.g., web pages, images, word documents, and documents in a portable document format (pdf)). The electronic data making up a document may consist of static and/or dynamic content.

"Sub-document element" is used herein to mean an element of a document's structure that when taken on its own is less than the whole of the document, which sub-document element may be of a type selected from the set of words, images, phrases, sentences, paragraphs, pages, sections, and chapters.

"Co-user" is used herein to mean any user (e.g., an individual or alias of an individual) or group of users (e.g., a distribution list of individuals within a group or organization) that may be identified to or known to a "user" of a general purpose computer (as may be permitted using access controls and/or blocking), which may be known or made known to the user of the general purpose computer by, for example, using an identifier such as a user or login name.

B. Operating Environment for Dynamic Annotation and Search

Figure 1:
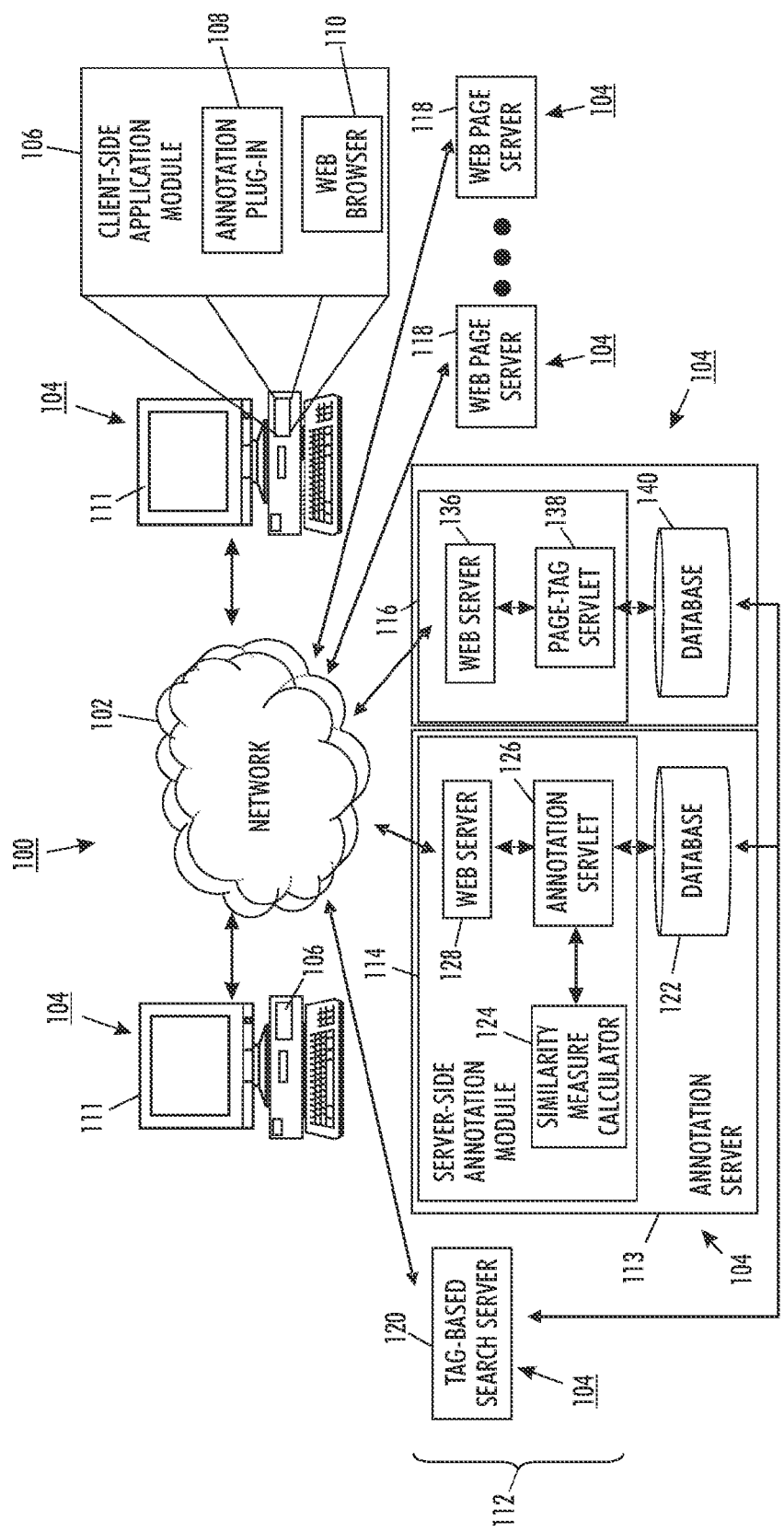
FIG. 1 illustrates an embodiment of an annotation server and annotation client(s) in an example operating environment.

FIG. 1 illustrates an example operating environment 100 for performing embodiments disclosed herein. In the example operating environment, general purpose computers 104, which may communicate together over a network 102 such as the Internet, are programmed to perform either client-side or server-side operations. Those skilled in the art will appreciate that alternatives to client-server arrangements exist such as a central terminal-based arrangements, or combinations thereof. The client-side operations are performed by general purpose computers 104 loaded with client-side application module 106, which includes annotation plug-in 108 and web browser 110 (such as Internet Explorer, Firefox, or Safari). The server-side operations are performed by general purpose computers loaded with one or more server-side application module 112, which includes either one or a combination of one or more of annotation module 114, page-tagging module 116, web page (or web document) servers 118, and tag-based search server 120.

Figure 2:
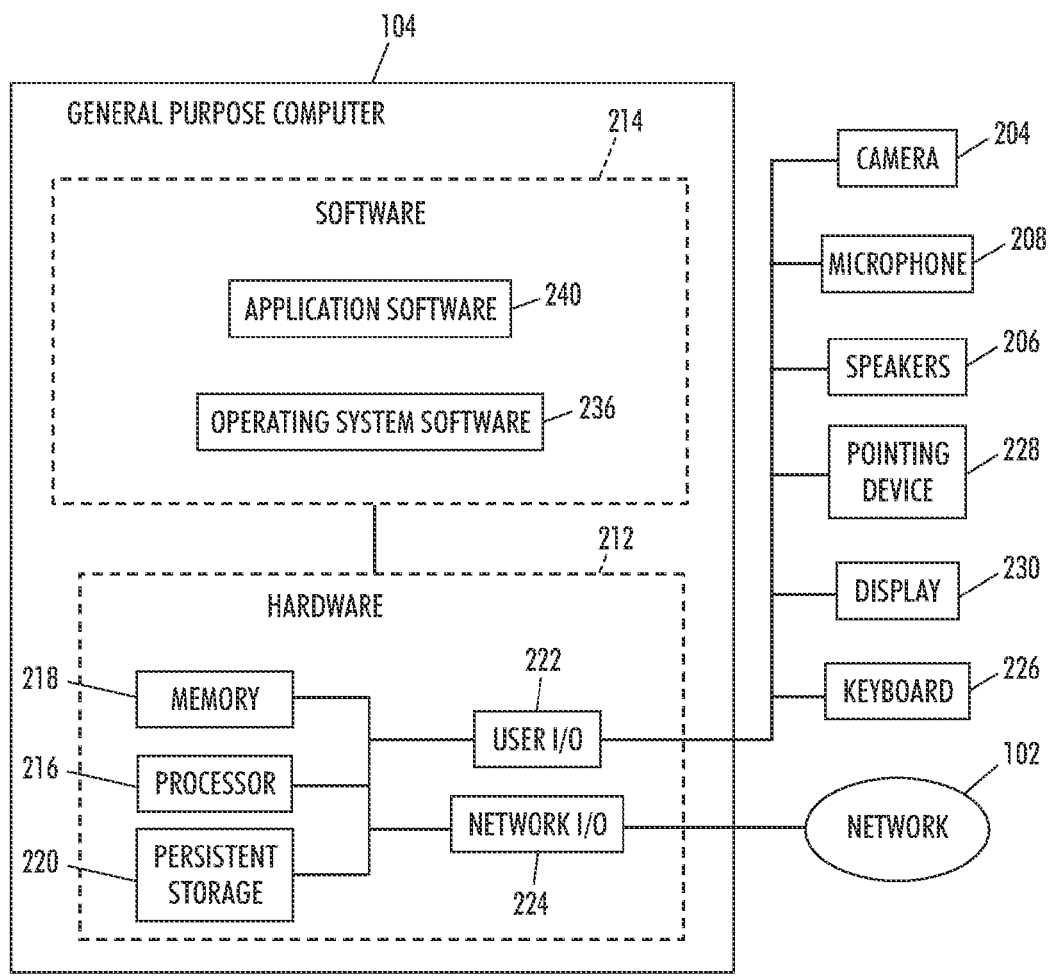
FIG. 2 illustrates a general purpose computer for carrying out embodiments disclosed herein, such as the embodiment shown in FIG. 1.

FIG. 2 illustrates a general purpose computer 104 for carrying out embodiments disclosed herein, such as the embodiment shown in FIG. 1. The general purpose computer 104 includes hardware 212 and software 214. The hardware 212 is made up of a processor (i.e., CPU) 216, memory 218 (ROM, RAM, etc.), persistent storage 220 (e.g., CD-ROM, hard drive, floppy drive, tape drive, etc.), user I/O 222, and network I/O 224. The user I/O 222 can include a camera 204, a microphone 208, speakers 206, a keyboard 226, a pointing device 228 (e.g., pointing stick, mouse, etc.), and the display 230. The network I/O 224 may for example be coupled to a network 102 such as the Internet. The software 214 of the general purpose computer 104 includes operating system software 236 and application software 240, which may include the instructions of the client-side application module 106 or the server side application module 108. The software 214 is generally read into the memory 218 to cause the processor 216 to perform specified operations, including the application software 240 with the instructions of the client-side application module 106 or the server side application module 108.

C. Dynamic Annotation Elements and Operations

Figure 3:
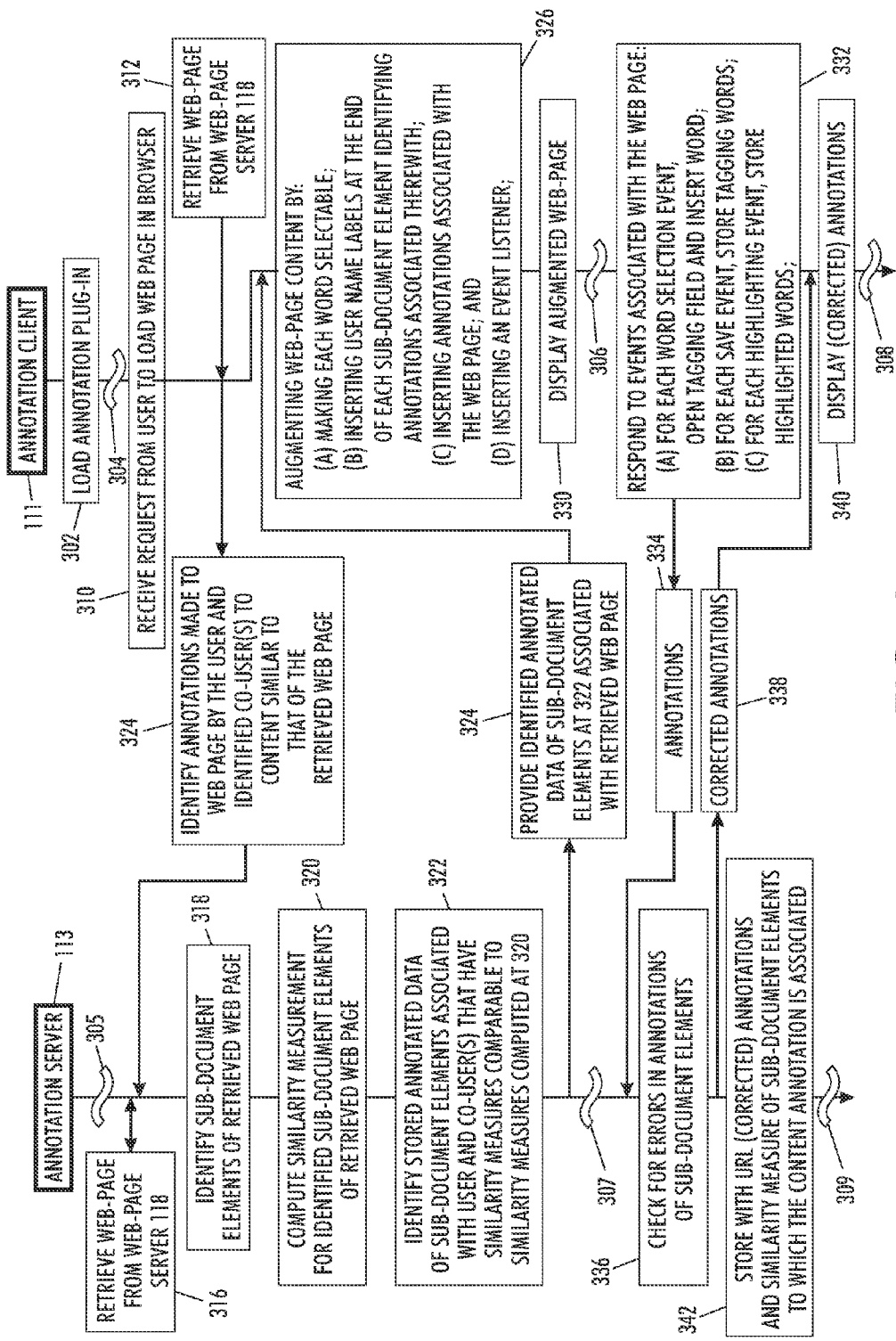
FIG. 3 is a flow diagram setting forth the operations performed by the annotation server and annotation client(s) in the example operating environment shown in FIG. 1.

FIG. 3 is a flow diagram setting forth the operations performed by annotation server 113 and annotation client(s) 111 shown in the example operating environment 100 in FIG. 1. The annotation server 113 and annotation client(s) 111 enable dynamic annotation of sub-document elements. By way of example and not limitation, the examples described herein relate to the annotation of paragraph sub-document elements of web pages. As will be appreciated by those skilled in the art, different sub-document elements and documents, or combinations thereof, may alternatively be used when carrying out the operations of dynamic annotation enabled herein.

Initially at 302, the web browser 110 of the client-side application module 106 is initialized with an annotation plug-in 108, which includes operations for communicating with server-side application module 112 and operations for augmenting documents for enabling both (a) user specification of annotations of a document displayed using web browser 110, and (b) display of user-annotated and co-user annotated data. Generally, operations performed on the client-side between 304 and 306 and on the server-side between 305 and 307 concern the augmentation of web pages with annotations and in preparation for user annotation, while operations on the client-side between 306 and 308 and on the server side between 307 and 309 concern user annotation of augmented web pages. In another embodiment, the functions of the annotation plug-in 108 can be provided by a proxy server (operating on the network 102) that augments documents with annotation functions before passing the documents to the user.

At 310, the web browser 110 receives a user request to load a web page for display. At 312, the requested web page is accessed using, for example, a URL (universal resource locator) that identifies a location on the network 102 of a server such as a web page server 118 storing the web page. At 314, the annotation plug-in 108 in response to the web page request at 312, communicates the requested web page (e.g., by sending its URL) with annotation servlet 126 through web server 128 to request a service be performed by the server-side annotation module 114 to identify annotations made by the user and any identified co-users to content similar to that of the requested web page.

At 316, the server-side annotation module 114 retrieves a copy of the subject web page (e.g., using the URL provided at 314) from the web page server 118. Alternatively, a copy of the web-page retrieved at 312 may be provided by the client-side application module 106 along with the service request at 314. At 318, the server-side annotation module 114 identifies in the retrieved web page one or more web page sub-document elements, which may be of a single type, such as a paragraph, or a combination of types, such as paragraphs and sections. At 320, a similarity measurement is computed for those sub-document elements identified at 318 that are associated with the user and selected co-users using similarity measure calculator 124. The similarity measure may be computed based on any one or more factors (that act as a unique identifier or fingerprint), such as for example: (a) the length of the words appearing in the sub-document element, (b) the first characters of the first n words that appear in the sub-document element, (c) the frequency of similar non-stop words appearing in the sub-document element, and (d) MD5 (Message-Digest algorithm 5), a cryptographic hash function. In one embodiment, each measure of similarity (or fingerprint) is a hash value of the associated sub-document element for which it is computed. Once computed, the fingerprint of annotated sub-document elements stored at the annotation server 113 may be compared against the fingerprint of the sub-document elements of the retrieved web page identified at 318.

At 322, web page sub-document elements (having associated annotations and similarity measures) previously annotated either by the user or co-users that are recorded in database 122 with similarity measures comparable (i.e., are likely to be the same or similar fingerprints) to the similarity measures computed at 320 are identified. At 324, the stored annotated data of the sub-document elements identified at 322 is provided to the client-side application module 106.

At 326, the web page is augmented for display and (further) annotation by: making, at 326(A), each word on the web page separately selectable; inserting, at 326(B), user name labels at the end of a sub-document element and associated stored user's annotation data of the sub-document element identified at 322, including textual annotations (such as tags, keywords, or comments), graphical annotations (such as graphical icons), or audio/video annotations (such as links to audio or video clips); and inserting, at 326(C), annotations (such as highlighting, which may include text, graphics, audio, or video) made to the content of sub-document elements of the web page associated with the stored annotated data identified at 322. The annotations inserted in the web page at 326(B) and 326(C), respectively, may be made to sub-document elements (or to a combination of sub-document elements, such as a chapter of a document defined by a combination of sub-document elements) of the retrieved web page identified at 318 when the sub-document elements are similar to (or have matching fingerprints of) the sub-document elements of annotated data stored at 322 in database 122.

In one embodiment at 326, the annotation plug-in 108 makes each word on a web page selectable by augmenting HTML content of the web page (using, for example, AJAX) by: (a) altering, at 326(A), the Document Object Model (DOM) tree of a web page by enclosing each word of the web page with an HTML (HyperText Markup Language) tag <span> before it is loaded by web browser 110; and (b) attaching, at 326(D), an event listener, such as a mouse event listener, to each sub-document element for detecting word selections performed by the user in the web page.

Figure 4:
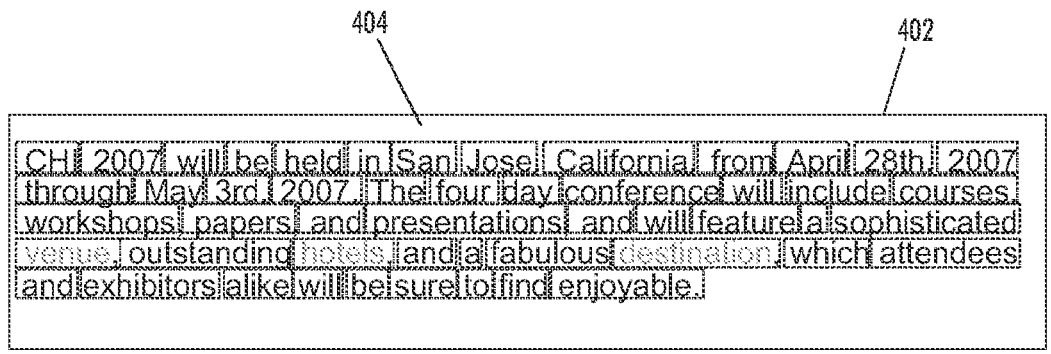
FIG. 4 illustrates an example of textual content in which words of a sub-document element have been made individually selectable using bounding box rectangles.

FIG. 4 illustrates an example of textual content 402 in which words of a sub-document element have been made individually selectable (and/or annotatable) using bounding box rectangles. For example, a user selecting (and/or annotating) with a pointing device such as a mouse within bounding box 404 is determined to have selected the word "San". Depending on a user's preferences, dynamic operations that are already associated with words may be set to have priority over selection (and/or annotation) operations. For example, in the event the word "San" was associated with a hyperlink, when a higher priority is given to the hyperlink then the link is followed; otherwise, when a higher priority is given to operations associated with the annotation plug-in then selection (and/or annotation) operations are performed. In an alternate embodiment, higher level constructs such as phrase and sentences are made selectable (and/or annotatable) within a bounding box (which may take on any number of different shapes) when enclosing a phase or sentence.

Figure 5:
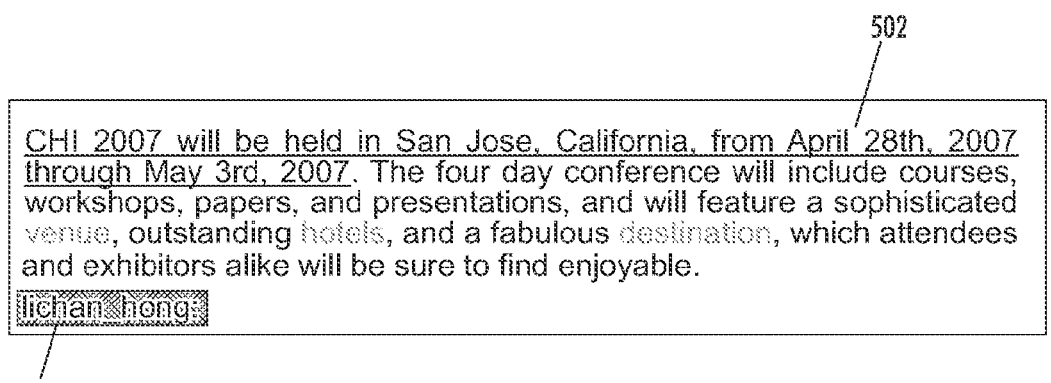
FIG. 5 illustrates a sub-document element with a user name label inserted thereafter.

Subsequent to augmenting the web page at 326, the web page is displayed at 330 and made available to the user for (a) viewing annotations previously applied to similar content by the user or identified co-users and (b) further annotation. At 332, an event handler in the annotation plug-in receives and responds to events associated with input received from the user directed at the displayed web page. An event that indicates portions of a sub-document element to be annotated, causes the event handler to transmit, at 334, and store, at 342, the annotations in the database 122 (together with the similarity measure (or fingerprint) of the sub-document element associated with the annotations), respectively, and present them for display on the web page to the user at 340. For example, FIG. 5 illustrates a sub-document element 502 with a user name label 504 inserted thereafter. In this example, the user annotated the document by highlighting the underlined text by first pointing the mouse to the beginning of the text (i.e., "CHI"), then pressing and holding the left mouse button until the mouse is moved to the end of the text sentence (i.e., "2007").

An event that indicates a word selection by the user, causes the event handler to open a tagging comment field on the web page and the selected word to be inserted therein as a tag (and in one embodiment cause the name label field to be inserted). An event that indicates the selected tags or keywords to be saved, causes the event handler to transmit the saved tags and/or keywords to the server-side annotation module 114 to be checked for errors (which may include correcting spelling and/or punctuation errors, formatting inconsistencies, and/or eliminating stop-words in a specified annotation) at 336 and subsequently stored (together with the similarity measure (or fingerprint) of the sub-document element associated with the word selection) at 342. Annotations that are corrected at 336 are transmitted back at 338 to the annotation client 111 for subsequent display at 340. For example, FIG. 6 illustrates the sub-document element 602 followed by user name label 604 (as shown in FIG. 5) during which a word selection is performed for tagging the sub-document element 602.

Figure 6:
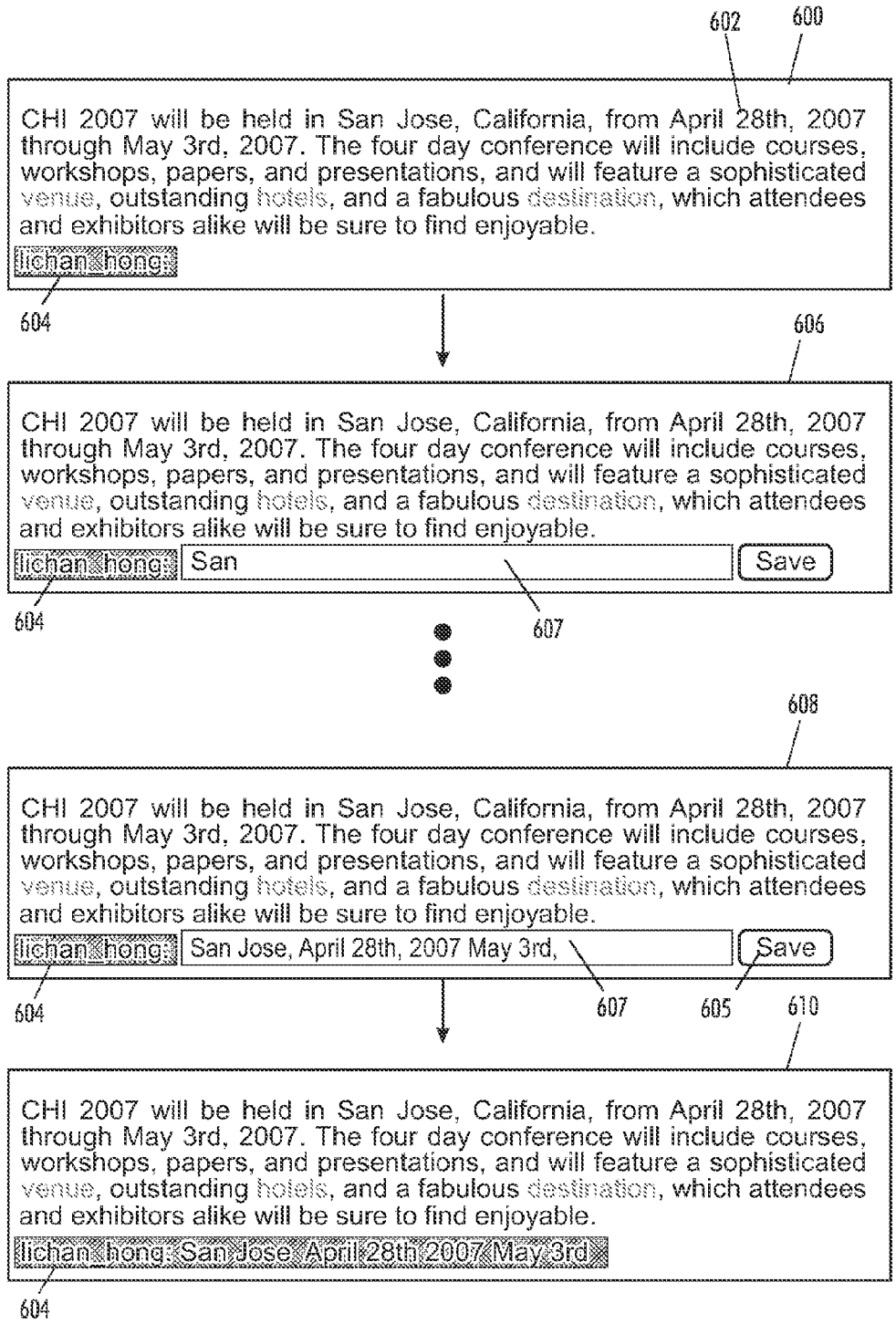
FIG. 6 illustrates a series of image frames as tagging is performed by a user to a web page displayed in a viewer.

More specifically, in FIG. 6 there is illustrated a series of image frames as tagging is performed by a user of a web page displayed in a viewer. At frame 600, the sub-document element 602 is augmented with a user name label 604 inserted after it, and by making each word of the sub-document element 602 selectable. At frame 606, responsive to user input selecting the word "San", the displayed document is further augmented by inserting the selected word "San" in a tagging comment field 607 following the user name label 604 (i.e., following, or associated with, the sub-document element associated with the selected word). At frame 608, the displayed document is further augmented with selected words: "Jose,"; "April"; "28th,"; "2007"; "May"; and "3rd,". Once the "save" button 605 is clicked the selected (or typed) annotations are corrected at 336 in FIG. 3 (e.g., commas that were originally considered part of a word are removed) in one embodiment by the annotation server 113 (or in an alternate embodiment, not shown, by the annotation plug-in 108) before finalizing the selected words that follow the user name label 604 as shown at frame 610. In alternate embodiments (not shown), lists of keywords associated with co-users and selectable lists of most frequently and/or most recently used keywords (added to the web page, for example, following the user and co-user keywords), may be similarly made selectable to add to the tagging comment field 607. In yet another embodiment, selected words are not placed in the tagging comment field 607 before being finalized, but instead are immediately placed in the form illustrated in frame 610.

Advantageously, after annotating a web page the user's annotations are stored by the annotation server 113 in database 122 to enable propagation of annotations to web pages with similar content. In other words, annotations propagate when the annotation server 113 provides the annotation client 111 with stored annotations to add to any document that contains content similar to that of the stored content. In addition, the annotation server 113 does not propagate stored annotations to the annotation client 111 that fail to match the fingerprint of the content of a sub-document element, even if the content may have previously existed on the web page being viewed when the annotations and the fingerprints of sub-document elements of the web page were originally recorded.

D. User Interface for Creating and Sharing Annotations

Figure 7:
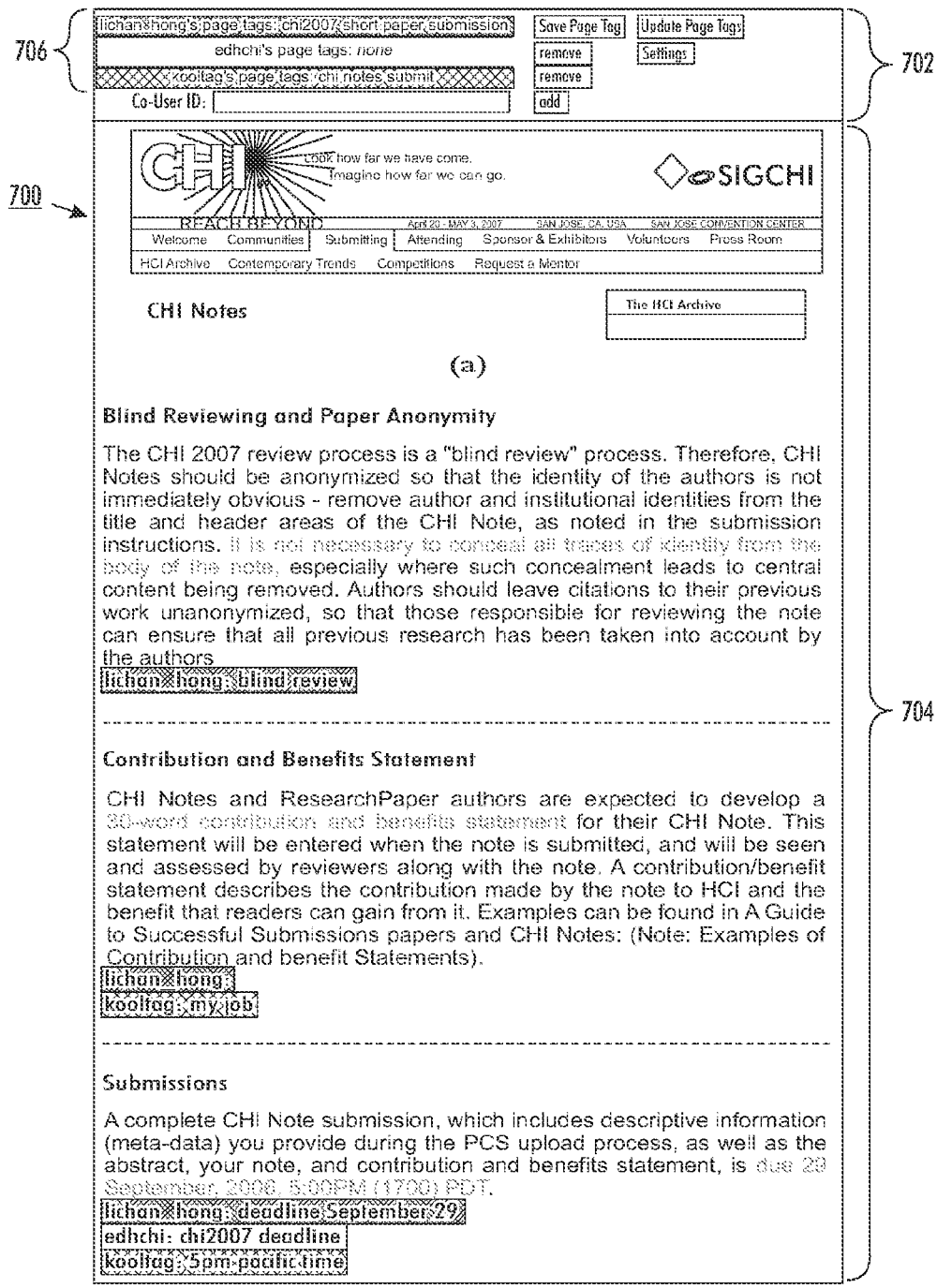
FIG. 7 illustrates an example user interface for creating and sharing annotations to a web document.

FIG. 7 illustrates an example user interface 700 for creating and sharing annotations. At the top of the user interface 700, a control area 702, which includes "remove" and "add" commands, allows a user to specify those co-users whose annotations the user would like to see displayed in documents that the user is viewing.

Further, the area 702 enables a user to specify page-level tagging of the user and view the page-level tags of specified co-users. Page-level tagging, as opposed to tagging at sub-document levels, simply associates tags, keywords, or comments with a web page (or URL). Similar to tagging of sub-document elements, page-level tagging is recorded at 706, which in one embodiment includes using commands "Save PageTag" and "Update PageTags" in the area 702 and accessing the database 140 through web server 136 by page-tag servlet 138 (which may in an alternate embodiment be integrated with or operate together with server side annotation module 114).

Below the control area 702 is the document area 704. In the document area 704, web page content is augmented, which includes in this example annotations associated with a user ("lichan_hong") and selected co-users ("edhchi" and "kooltag"). Thus, by examining the control area 702 and the document area 704, a user is able to see whether the displayed document is annotated at a page level and/or sub-document level.

E. Tag-Based Search

Using a web-based annotations service such as that made available by the client-side annotation module 106, users are given the ability to bookmark web documents and attach a set of tags or keywords to (or more generally annotate, by for example highlighting or attaching comments to) the document bookmark at the page level (and in an alternate embodiment to document elements at the sub-document element level). Subsequently, the user may search and retrieve the document from the user's personal bookmark collection using the set of tags of the user. Additionally, users may elect to share, either publicly to all users or semi-publicly to selected co-users, their bookmarks (and associated tags or keywords), which may then be browsed and searched by other users. This collaborative sharing of user cultivated document bookmark collections enables users to benefit by allowing bookmarked documents to be discovered using the shared user (i.e., collaboratively developed) bookmark collection.

In one embodiment shown in FIG. 1, collaboratively shared bookmark collections stored in databases 122 and 140 may be searched using tag-based search server 120 through a user interface running on web browser 110. Before queries may be performed by users to discover bookmarked documents, a bookmark collection associated with a group of users is processed and cached to identify tag profiles and document profiles for bookmarked documents in the bookmark collection. Generally, tag profiles and document profiles for a selected tag object (e.g., TAG2) and selected document object (e.g., URL1) are constructed by performing a spreading activation using that selected tag or document object in a bigraph as an entry node.

Figure 8:
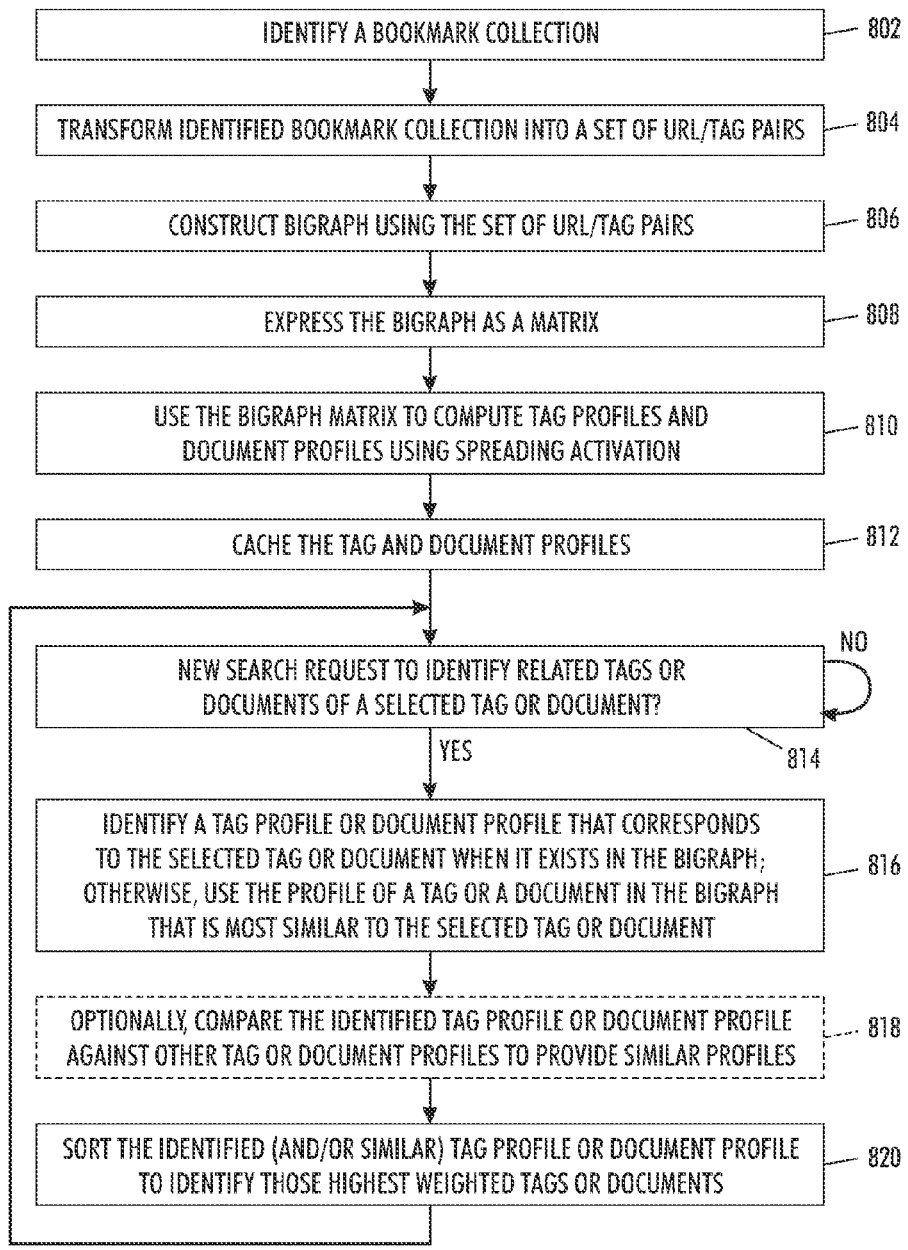
FIG. 8 is a flow diagram setting forth operations performed by a tag-based search service.

FIG. 8 is a flow diagram setting forth operations performed by the tag-based search service for identifying tag and document profiles (at 802, 804, 806, 808, 810, and 812) and providing results for tag-based queries (at 814, 816, 818, and 820). Initially at 802, a bookmark collection is identified, which in one embodiment may be a list of document identifiers (such as URLs), where each bookmark in the bookmark collection identifies a document with a URL that has associated therewith a set of tags (e.g., [URL1, TAG2, TAG6, ..., TAGN]). At 804, the bookmark collection is decomposed (i.e., transformed) into a set of URL/TAG pairs (e.g., [URL1, TAG2], [URL1, TAG6], ... [URL1, TAGN]). Given URL/TAG pairs in the form of [URL, TAG] tuples, a bigraph (or two-dimensional graph) of URLs to tags is constructed at 806. Once a bigraph is constructed, the bigraph is expressed as a matrix (at 808). Alternatively, the bigraph may be represented using, for example, adjacency lists.

Figure 9:
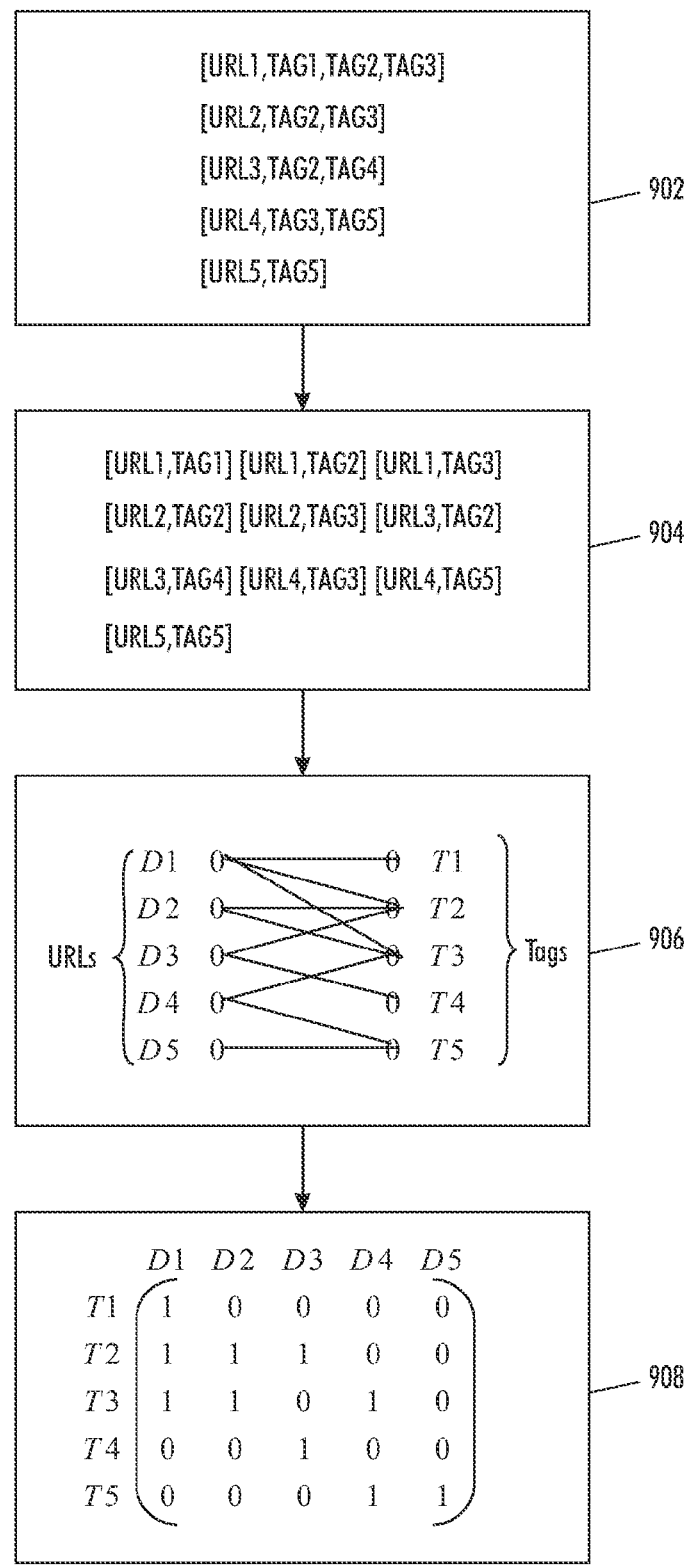
FIG. 9 illustrates an example bookmark collection processed in the manner outline in FIG. 8.

FIG. 9 illustrates an example bookmark collection at 902 that has been identified (as specified at 802 in FIG. 8) and processed at 904 into a set of URL/TAG pairs (as specified at 804 in FIG. 8), at 906 into a bigraph (as specified at 806 in FIG. 8), and at 908 into a matrix form with columns identifying URLs and row identifying tags for the bigraph shown at 906 (as specified at 808 in FIG. 8).

At 810, the bigraph matrix (or more generally any n-dimensional matrix) is used to compute tag profiles and document profiles over the nodes of the bigraph by computing the profiles using spreading activation iteratively as vectors A as follows:

$$A[1]=E;$$

$$A[2]=\alpha M^*A[1]+\beta E;$$

.

.

.

$$A[n]=\alpha M^*A[n-1]+\beta E;$$

where:

A[1], A[2], ... A[n] are iteratively computed profile vectors of URLs and tags;

E is a unit vector representing a tag or document entry node;

M is a matrix representation of the bigraph (or more generally any n-dimensional graph) arranged by column or row according to the selected entry node;

$\alpha$ and $\beta$ are parameters for adjusting spreading activation.

After iteratively performing spreading activation for "n" steps (which number of steps "n" may vary depending on accuracy and/or performance), spreading activation is stopped on the tag side of the bigraph or document side of the bigraph, thereby providing a tag profile vector or document profile vector for the tag or document entry node E. The resulting pattern of weights in the tag profile vector and document profile vector define "tag profiles" and "document profiles", respectively. FIG. 10 illustrates an example of spreading activation with "n" equal to 4 steps and with document 1 (i.e., URL1) as the entry node E, with the parameter $\alpha$ equal to one and the $\beta$ parameter equal to zero, and with resulting tag profile vector $A[4]_{TAG}$ and the resulting document profile vector $A[3]_{DOC}$ for the document D1.

As shown in FIG. 10, after each iteration (i.e., n=2, n=3, and n=4) the resulting document and tag profile vectors identify the most interesting tags or documents for an initial entry vector where the user expressed an interest in document $DOC_1$. The initial entry vector assigned $DOC_1$ a weight of 1. At step n=2, FIG. 10 illustrates that $DOC_1$ is associated with $TAG_1$, $TAG_2$, and $TAG_3$. FIG. 10 further illustrates at step n=3, the spreading activation computation identifies interesting documents $DOC_1$, $DOC_2$, $DOC_3$, and $DOC_4$, where each is associated with the interestingness weight 3, 2, 1, and 1, respectively. Finally, at step n=4, the spreading activation computation identifies the resulting tag profile vector $A[4]_{TAG}$ indicating that $TAG_2$ and $TAG_3$ are the highest weighted tags for the original document entry vector where $DOC_1$=1.

Once the tag profiles and document profiles are computed at 810, they are in one embodiment cached for subsequent retrieval and search (at 812). In an alternate embodiment, such tag and document profiles are computed in real-time on demand. Users may search on a document collection using a search interface 1100 as illustrated in FIG. 11 that may be made available through web browser 110. The search interface 1100 enables users to specify key words and/or tags (at 1102) that are then used to identify (at 1106) related tags and documents (at 1104). This is accomplished by taking the keywords and/or tags at 1102 and looking up in the cached spreading activation computation (at 812 in FIG. 8), what other documents and tags are related and interesting. The spreading activated documents specified in the document profile vectors are displayed in 1104, and the spreading activated tags specified in the tag profile vectors are displayed in 1106. These are displayed in ranked order of their similarity according to the spreading activation weights.

The search results may then be refined further by the user by specifying which documents in 1104 are relevant, using, for example, methods known in the art as "relevance feedback". In one embodiment, users indicate their interest by clicking on a selection box. Documents that are selected may be looked up in the cached computation results (at 812 in FIG. 8), and their corresponding related tags and documents in the profile vectors may be used to inform future searches. Alternatively, users may also specify related tags, and the corresponding cached computation results (at 812) for those tags may be looked up and added to the current interest profile, which may then be used to inform future searches.

More generally once cached (at 812), the tag profiles and document profiles form the basis of different similarity computations and lookups for retrieval, search, and recommendations. For example, in the embodiment shown in FIG. 8, upon receipt of a search request to identify related tags or documents of a selected tag or document (at 814), the tag profile or document profile that correspond to the selected tag or document (at 816) is retrieved from cache. Alternatively at 816, if the selected tag or document does not exist in the spreading activation computation profiles cached at 812, then the profiles of a tag and/or document in the data cached at 812 are selected that are most similar to the missing tag or document. At step 816, the similarity between documents (and tags) may, for example, be determined using cosine similarity computations of document word vectors, or other similarity computations such as Euclidean distance or other vector distance metrics.

At 820, the identified tag profile and/or document profile are sorted to rank related tags and/or documents by importance. These most similar tags and/or documents arranged by rank are returned for presentation in for example the user interface 1100 illustrated in FIG. 11, which includes with each document link (e.g., "Dive Into Greasemonkey"), a list of those tags most frequently applied to the document (e.g., greasemonkey 65, firefox 33, programming 27, reference 18, and web 18). In an alternate embodiment, the tag profile or document profile identified at 816 are compared against all other document or tag profiles in the system to find similar profiles at 818, thereby identifying at 820 similar tags or documents in addition to or as an alternative to those identified at 816 using the identified tag and/or document profiles corresponding or similar to the selected tags and/or documents.

In other words at 814, 816, 818, and 820, if a user would like to find information related to a document, the tag-based search server may: (a) lookup the corresponding document profile, assuming the document already exists in its cached spreading activation computation profiles (at 812), and select and return for display selected documents in that profile arranged by relevance, for example, from highest to lowest weight (which arrangement of documents may in addition be filtered to retain only those weighted above a threshold value); (b) use the corresponding document profile to compare it against all other document profiles in the system to find similar document profiles, and thereafter select and return for display selected documents in those profiles arranged by relevance; and/or (c) use information retrieval techniques, such as computing the traditional cosine similarity measure of document word vectors, to find those most similar documents in the URL/TAG bigraph when the user specified document does not already exist in the cached spreading activation computation profiles (at 812), and thereafter use either (a) or (b) to select and return related documents. Alternatively, at 814, 816, 818, and 820, if a user would like to find information related to a tag, similar operations performed for a document are performed instead for the tag and the corresponding tag profiles.

In an alternate embodiment, keyword searches may be used to identify documents or tags cached in the spreading activation computation profiles (at 812), their profiles of which are subsequently used to identify related documents and tags. In yet other embodiments, when multiple keywords are provided as search criteria, the profile vectors associated with the tags and documents corresponding to the multiple keywords are summed together, ranked and subsequently used to identify documents and tags of interest. Alternatively, profile vectors corresponding to different keywords are weighted differently before being summed together, ranked and subsequently used to identify documents and tags of interest. Such summation of profile vectors may in addition be used to further refine results by adding additional keywords and/or documents into the set of profile vectors that is ultimately summed together, ranked and subsequently used to identify documents and tags of interest.

In yet further embodiments, the exemplary embodiments set forth herein may be extended beyond a two variable relationships between documents and tags. In such alternative embodiment, graphs may be for example defined between two different variables (e.g., such as between documents and users) or between three or more variables (e.g., such as between documents, tags, and users). The technique works for three or more variables since the spreading activation technique can be performed and cached for these different variables (e.g. resulting in tag profiles, document profiles, and user profiles).

Further, while shared bookmark collections are discussed in the forgoing embodiments, those skilled in the art will appreciate that bookmark collections may alternatively be substituted for shared collections of documents with metadata recording individual bookmark preferences with each document.

F. Miscellaneous

In addition in view of the above description, an embodiment for annotating a document in a viewer may be performed by the method of: associating the document with a user; identifying one or more sub-document elements in the document; augmenting the document by making words within the document selectable or by inserting a tagging comment field after identified sub-document elements; displaying the augmented document in the viewer; and responsive to each user input selecting a word in the document displayed in the viewer, further augmenting the document displayed in the viewer by inserting the selected word following the sub-document element from which the word was selected. Another embodiment for annotating a document in a viewer may be performed by the method of: identifying one or more sub-document elements in the document; computing a similarity measure for identified sub-document elements in the document; augmenting the located sub-document elements of the document with annotations associated with sub-document elements stored in a database that have comparable similarity measures; displaying the augmented document in the viewer; and responsive to each user input selecting a word in a document displayed in a viewer, recording in the database the selected word and the computed similarity measure of the sub-document element from which the word was selected.

Further in view of the above description, the forgoing embodiment includes the following features wherein: augmenting may include inserting the selected word in a tagging comment field, making in a list one or more of frequently and recently used keywords in the document selectable, and/or inserting a user name label of the user associated with the document after the sub-document element and before the tagging comment field; each word is made selectable using a bounding box that may include a plurality of words; the document may be a web page; a similarity measure may be computed for identified sub-document elements, and a record that associates the user may be stored in a database with the computed similarity measure of the sub-document element's content and the selected words that follow the user name label; the similarity measure may be a unique identifier that uniquely identifies sub-document elements; a URL of the document may be stored with the record where the located sub-document elements of the document is augmented with annotations of those annotated sub-document elements stored in the record that have comparable similarity measures; the selected word following the sub-document element may be displayed with a different appearance from the sub-document element; the one or more sub-document elements may be a type or plurality of types selected from the group consisting of words, images, phrases, sentences, paragraphs, pages, sections, and chapters.

Using the foregoing specification, the embodiments disclosed herein may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the disclosed embodiments. As such, the terms "article of manufacture" and "computer program product" as used herein are intended to encompass a computer program existent (permanently, temporarily, or transitorily) on any computer-usable medium such as on any memory device or in any transmitting device.

A machine embodying the disclosed embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosed embodiments as set forth in the claims. Those skilled in the art will recognize that memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for annotating a document in a viewer, comprising:
    associating the document with a user;
    identifying one or more sub-document elements in the document;
    computing a similarity measure from content of the identified one or more sub-document elements in the document;
    identifying one or more other sub-document elements in one or more further non-identical documents stored in a database, each of the one or more other sub-document elements associated with one or more annotations, with comparable similarity measures to the one or more sub-document elements in the document;
    augmenting the document, comprising:
        making words within the document selectable;
        responsive to each user input selecting a word in the document, inserting the selected word following the sub-document element from which the word was selected;
        inserting the one or more annotations associated with the identified one or more other sub-document elements with comparable similarity measures following the sub-document element in the document; and
        storing in a database a record that associates the user with the computed similarity measure of the sub-document element's content and the selected words and storing with the record a URL of the document as a URL/USER pair in a bi-graph matrix for generating spreading activation computation profiles; and
    displaying the augmented document in the viewer.

2. The method according to claim 1, wherein said augmenting further comprises inserting the selected word in a tagging comment field.

3. The method according to claim 2, wherein said augmenting further comprises making in a list one or more of frequently and recently used keywords in the document selectable.

4. The method according to claim 2, wherein said augmenting further comprises inserting a user name label of the user associated with the document after the sub-document element and before the tagging comment field.

5. The method according to claim 1, wherein each word is made selectable using a bounding box.

6. The method according to claim 5, wherein the bounding box includes a plurality of words.

7. The method according to claim 1, wherein the document is a web page.

8. The method according to claim 1, further comprising displaying the selected word following the sub-document element with a different appearance from the sub-document element.

9. The method according to claim 1, wherein the similarity measure is a unique identifier that uniquely identifies sub-document elements.

10. The method according to claim 1, wherein the one or more sub-document elements are a type selected from the group consisting of words, images, phrases, sentences, paragraphs, pages, sections, and chapters.

11. The method according to claim 1, wherein the sub-document elements are a plurality of types selected from the group consisting of words, images, phrases, sentences, paragraphs, pages, sections, and chapters.

12. A method for annotating a document in a viewer, comprising:
associating the document with a user;
identifying one or more sub-document elements in the document;
computing a similarity measure from content of the identified one or more sub-document elements in the document;
identifying one or more other sub-document elements in one or more further non-identical documents stored in a database, each of the one or more other sub-document elements associated with one or more annotations, with comparable similarity measures to the one or more sub-document elements in the document;
augmenting the document, comprising:
inserting a tagging comment field after identified sub-document elements;
responsive to each user input selecting a word in the document, inserting the selected word in the tagging comment field corresponding to the sub-document element from which the word was selected;
inserting the one or more annotations associated with the identified one or more other sub-document elements with comparable similarity measures following the sub-document element in the document; and
storing in a database a record that associates the user with the computed similarity measure of the sub-document element's content and the selected words and storing with the record a URL of the document as a URL/USER pair in a bi-graph matrix for generating spreading activation computation profiles; and
displaying the augmented document in the viewer.

13. The method according to claim 12, wherein said augmenting further comprises inserting a user name label of the user associated with the document after the sub-document element and before the tagging comment field.

14. The method according to claim 13, wherein the similarity measure is a unique identifier that uniquely identifies sub-document elements.

15. The method according to claim 12, wherein the sub-document element is a paragraph.

16. The method according to claim 12, wherein said augmenting further comprises augmenting the document by making each word within the document selectable using a bounding box.

17. The method according to claim 16, wherein said augmenting further comprises making in a list one or more of frequently and recently used keywords in the document selectable.

18. A method for annotating a document in a viewer, comprising:
identifying one or more sub-document elements in the document;
computing a unique identifier from content of the identified sub-document elements in the document;
identifying one or more other sub-document elements in one or more further non-identical documents stored in a database, each of the one or more other sub-document elements associated with one or more annotations, with comparable unique identifiers to the one or more sub-document elements in the document;
augmenting the located sub-document elements of the document, comprising:
responsive to each user input selecting a word in the document, inserting the selected word following the sub-document element from which the word was selected; and
inserting the one or more annotations associated with the identified one or more other sub-document elements with comparable similarity measures following the sub-document element in the document; and
storing in a database a record that associates the user with the computed similarity measure of the sub-document element's content and the selected words and storing with the record a URL of the document as a URL/USER pair in a bi-graph matrix for generating spreading activation computation profiles;
displaying the augmented document in the viewer; and
recording in the database the selected word and the computed unique identifier of the sub-document element from which the word was selected.

* * * * *